United States Patent [19]

Fuwa

[11] 4,160,279
[45] Jul. 3, 1979

[54] OPTOELECTRONIC READING APPARATUS

[75] Inventor: Jyoichi Fuwa, Tokyo, Japan

[73] Assignee: Ricoh Company, Ltd., Tokyo, Japan

[21] Appl. No.: 836,973

[22] Filed: Sep. 27, 1977

[30] Foreign Application Priority Data

Sep. 29, 1976 [JP] Japan .................................. 51-116905

[51] Int. Cl.² .............................................. H04N 1/17
[52] U.S. Cl. ..................................................... 358/288
[58] Field of Search .............. 358/133, 137, 260, 288;
340/146.3 AH

[56] References Cited

U.S. PATENT DOCUMENTS

| 3,344,231 | 9/1967 | Dodd et al. ........................... 358/288 |
| 3,472,953 | 10/1969 | Montevecchio ...................... 358/260 |
| 3,499,975 | 3/1970 | Arps ...................................... 358/288 |
| 3,581,000 | 5/1971 | Hansen et al. ........................ 358/288 |
| 3,670,099 | 6/1972 | Oliver ................................... 358/288 |
| 3,941,926 | 3/1976 | Slobodzian et al. ................. 358/133 |
| 3,947,627 | 3/1976 | Tanaka ................................. 358/288 |

OTHER PUBLICATIONS

Cassada, Garcia—Graphic Communication System Incorporating Scan Resolution Control—IBM Tech. Discl., vol. 15, #8, Jan. 1973, p. 2367.

Primary Examiner—John C. Martin
Assistant Examiner—Joseph A. Orsino, Jr.
Attorney, Agent, or Firm—David G. Alexander

[57] ABSTRACT

For facsimile transmission or the like an optical system scans an original document and produces quantized electrical signals which are stored in a buffer memory. A data compression unit reads out the signals and performs data compression thereon asynchronously with storage of the signals in the buffer memory. The data compression rate decreases in accordance with the proportion of high density areas of the document, and the electrical data signals accumulate in the buffer memory. The scanning speed is automatically decreased as the amount of signals in the buffer memory increases so that the scanning speed is controlled to correspond to the data compression rate.

11 Claims, 5 Drawing Figures

— OPTOELECTRONIC READING APPARATUS

BACKGROUND OF THE INVENTION

The present invention relates to an optical reading apparatus for a facsimile system or the like.

In a typical optical reader an optical system scans an original document such as a page of a book and focusses a light image of the document onto a photosensor array which produces electrical data signals corresponding to the light image. These signals are stored in a buffer memory. In order to reduce transmission time in a facsimile system, the data signals read from the buffer memory are compressed in such a manner as to reduce redundant data corresponding to blank background areas of the document and the like. The data compression rate varies in accordance with the amount of redundant data. More specifically, the higher the proportion of high density areas of the document corresponding to printed characters and the like (the lower the proportion of redundant white background areas) the lower the data compression rate.

The optical system generally comprises a transparent platen which supports the document and is moved by a drive motor for vertical scanning. The photosensor array typically comprises a linear array of photosensor elements which are arranged perpendicular to the direction of movement of the platen. The elements are sequentially enabled or strobed for horizontal scan.

If the platen were moved at constant speed, a buffer memory having a capacity large enough to accomodate an entire document page would have to be provided to compensate for the variation in the data compression rate. Such a memory would be extremely expensive and large in size, even utilizing integrated circuit technology.

A system has been proposed in the prior art which comprises a pulse or stepping motor to move the platen for scanning and a buffer memory having a relatively small capacity. The stepping motor is energized in accordance with the data compression rate to intermittently effect vertical scan as the data in the buffer memory decreases from a predetermined median value. Such a system is responsive to intricate patterns on the document. However, the stepping motor must be of disproportionately high power to intermittently move a heavy glass platen which supports a heavy document such as a book. Such a motor is large, expensive, and wasteful of electrical energy.

SUMMARY OF THE INVENTION

The present invention overcomes the drawbacks of the prior art by sensing the amount of electrical data signals in a buffer memory having a capacity of only several tenths of a page. The vertical and horizontal scan are controlled in accordance with this amount of data which in turn corresponds to the data compression rate.

It is an object of the present invention to provide an optoelectronic reading apparatus which comprises a buffer memory of substantially reduced capacity and cost compared to the prior art.

It is another object of the present invention to provide an optoelectronic reading apparatus which comprises a small and inexpensive inertia scan drive motor.

It is another object of the present invention to optimally and continuously vary a scan rate in accordance with a data compression rate in an optoelectronic reading apparatus.

It is another object of the present invention to provide a generally improved optoelectronic reading apparatus.

Other objects, together with the foregoing, are attained in the embodiment described in the following description and illustrated in the accompanying drawing.

DESCRIPTION OF THE PREFERRED EMBODIMENT

While the optoelectronic reading apparatus of the invention is susceptible of numerous physical embodiments, depending upon the environment and requirements of use, substantial numbers of the herein shown and described embodiment have been made, tested and used, and all have performed in and eminently satisfactory manner.

Figure 1:
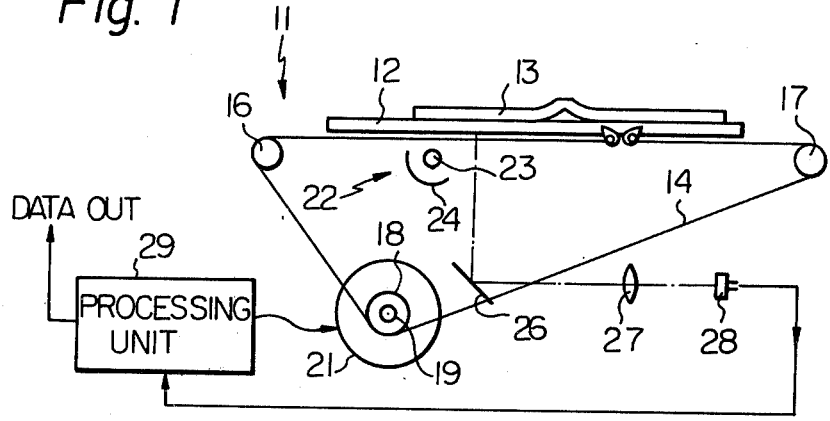
FIG. 1 is a schematic view of an optoelectronic reading apparatus embodying the present invention.
Figure 2:
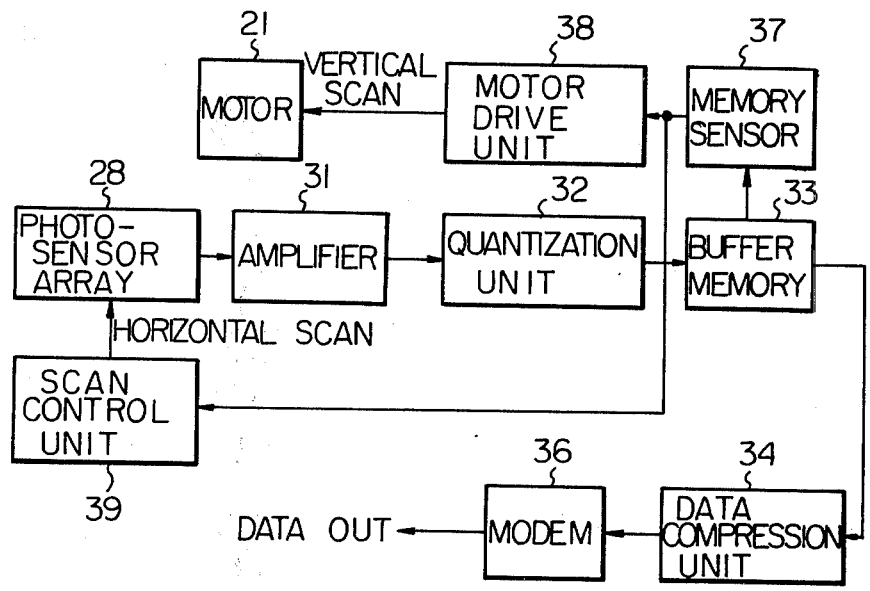
FIG. 2 is an electrical block diagram of the reading apparatus.

Referring now to FIG. 1 of the drawing an optoelectronic reading apparatus embodying the present invention is generally designated by the reference numeral 11 and comprises a transparent glass platen 12. An original document which is shown as being in the form of a heavy book 13 is placed face down on the platen 12 and supported thereby. A drive chain 14 is trained around sprockets 16, 17 and 18 and connected to an edge of the platen 12. The sprocket 18 is fixed to a shaft 19 of a drive motor 21 which is a relatively low power inertia motor.

A light source 22 comprising a lamp 23 and an elliptical reflector 24 is disposed below the platen 12 and illuminates the book 13 from below. A plane mirror 26 reflects a light image of a linear portion of the book 13 extending perpendicular to the plane of the chain 14 through a converging lens 27 which focusses the light image onto a photosensor array 28. The output of the photosensor array 28 is fed to a processing unit 29 which will be described in detail below.

The photosensor array 28 comprises a linear array of optoelectronic photosensor elements such as photodiodes, although not shown in detail. Typically, a large number of photosensor elements are provided in monolithic form, such as 1728 elements, with the width of the array 28 being equal to the width of the light image. Thus, the array 28 divides the light image into 1728 discrete portions. For each scan line the photosensor elements are sequentially enabled or strobed to effect horizontal scan. The motor 21 moves the platen 12 and book 13 perpendicular to the array 28 to effect vertical scan.

A block diagram of the processing unit 29 in combination with the other electrical components of the apparatus 11 is shown in FIG. 1. The output of photosensor array 28, which consists of electrical signals corresponding to the intensity of the light image incident on the respective photosensor elements, is fed through an amplifier 31 to a quantizatiobn unit 32. The unit 32 compares the magnitude of the electrical signals with a predetermined level and produces a logically high binary data signal whenever a signal is above the predetermined level indicating that the signal represents a dense portion of the light image. Where the document is the book 13, a dense portion corresponds to a point on a printed character. The unit 24 produces a logically low binary data signal whenever a signal is below the predetermined level indicating that the signal represents a blank white or background portion of the book 13. The data signals from the unit 24 are stored in a buffer memory 33 which has a relatively small capacity such as several tenths of a page. The data signals are read out of the buffer memory 33 by a data compression unit 34 which compresses the data by elminating various logically low or blank blocks of data signals which are logically redundant. The compressed data signals are transmitted to a remote receiver (not shown) through a modem 26. The receiver is typically a facsimile transceiver comprising a receiver section for producing a reproduction of the book 13 from the transmitted data signals.

The apparatus 11 further comprises a memory sensor 37 which senses the amount of unread data signals in the buffer memory 33. The data signals are read out of the buffer memory 33 by the data compression unit 34 in an asynchronous manner relative to the storage of the data signals in the buffer memory 33 from the quantization unit 32. The memory sensor 37 preferably determines the amount of data in the buffer memory 33 by subtracting the amount of data read out from the amount of data stored in the buffer memory 33.

As described hereinabove, the amount of data in the buffer memory depends on the data compression rate which in turn depends on the relative proportion of logically high signals to logically low signals. A high proportion indicates that the data consists of a relatively large amount of actual character data compared to redundant white background data and vice-versa. The higher said relative proportion, the lower the data compression rate. If the scanning speed is maintained constant, the buffer memory 33 will fill up and overflow for low data compression rates and empty or underflow for high data compression rates.

For this reason, a control signal corresponding to the amount of data in the buffer memory 33 is fed from the memory sensor 37 to a motor drive unit 38 which controls the speed of the motor 21 and thereby the vertical scan speed. The control signal is also fed to a scan control unit 39 which controls the rate at which the photosensor array 28 is scanned, and thereby the horizontal scan rate. In this manner, synchronism between vertical and horizontal scan is maintained and the vertical data scan density is maintained constant. The memory sensor 37 controls the scanning speed in accordance with the data compression rate so that optimally the amount of data in the buffer memory 33 will remain constant at a median value. In other words, the scanning speed is automatically adjusted so that the input and output data rates of the buffer memory 33 are maintained equal regardless of the data compression rate.

Figure 3:
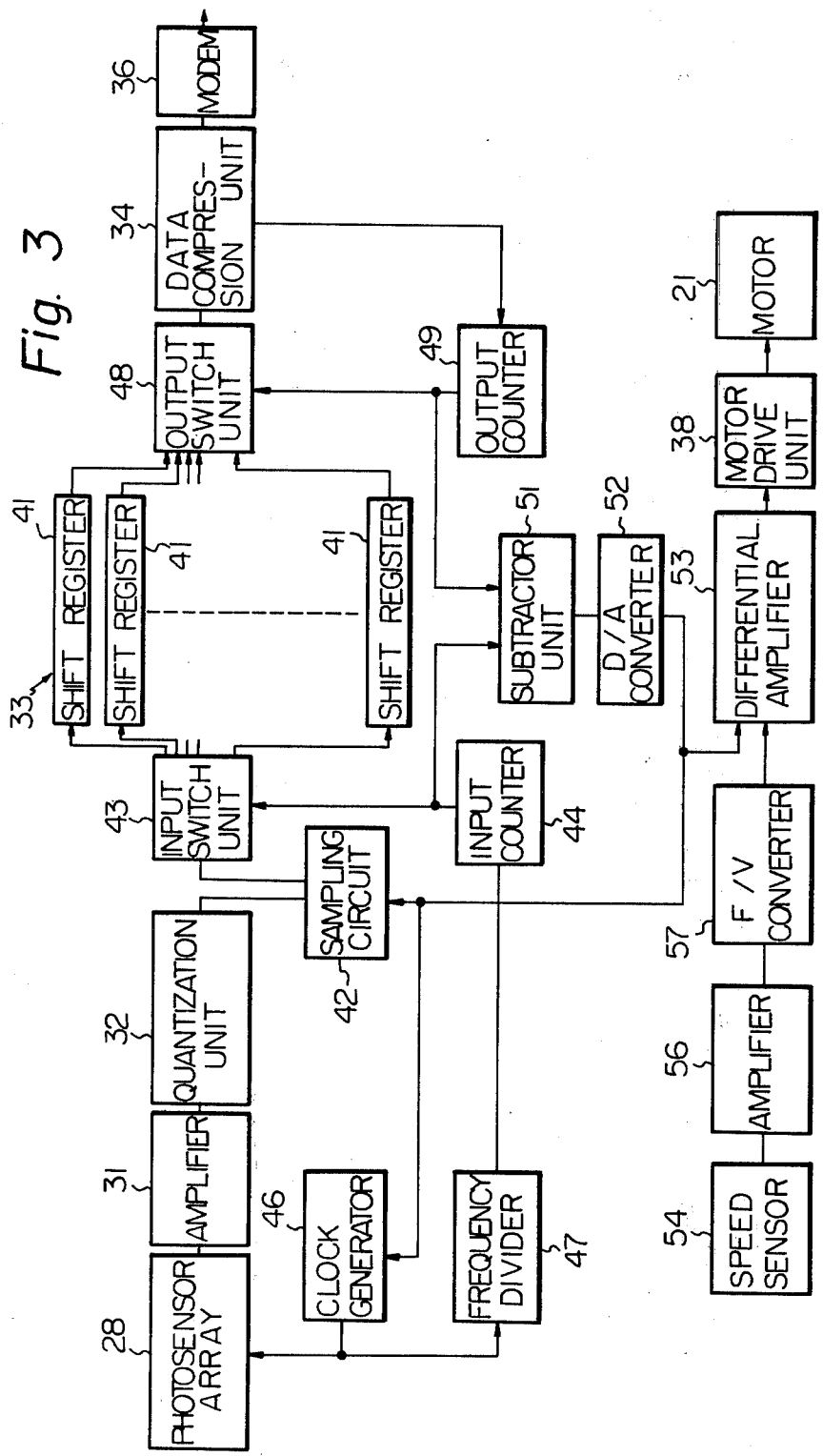
FIG. 3 is a more detailed block diagram of the reading apparatus.

The apparatus 11 is shown in greater detail in FIG. 3. The buffer memory 33 is shown as comprsing a plurality of identical shift registers which are each designated as 41. The data signals are applied to the shift registers 41 through a sampling circuit 42 and an input switch unit 43 which is controlled by an input counter 44. A clock pulse generator 46 generates clock pulses which are used to strobe the photosensor array 28 for horizontal scan. The clock pulses are also fed to a frequency divider 47 which produces an output pulse in response to 1728 clock pulses. In other words, the frequency divider 47 produces a pulse each time the first photosensor element of the array 28 is strobed. These pulses are applied to the input counter 44 which, in effect, counts the vertical scan lines.

The input switch unit 43 comprises a decoder and gate array connected to receive the output of the input counter 44 as will be described in detail below. Each shift register 41 has a capacity of one horizontal scan line or 1728 binary data signals. The first data signals are stored in the first shift register 41. Then, the input counter 44 is incremented from the frequency divider 47 and the next line of data signals are stored in the second shift register 41. After a line of data signals is stored in the last shift register 41 the counter 44 overflows and points again to the first shift register 41. In other words, the input counter 44 functions as a ring counter and has a capacity equal to the number of shift registers 41.

The data signals are read out of the buffer memory 33 through an output switch unit 48 which is controlled by the data compression unit 34 in a similar but asynchronous manner to the data storage. An output counter 49 selects the shift registers 41 in accordance with the amount of data signals processed by the unit 34. Each time a line of data signals is processed by the unit 34 the output counter 49 is incremented.

The contents of the counters 44 and 49 are compared in a subtractor unit 51 which produces an output corresponding to the difference between the counts in the counters 44 and 49. This indicates the amount of unread data signals in the buffer memory 33. The count in the counter 44 indicates the amount of data stored in the memory 33 and the count of the counter 49 indicates the amount of data which has been read out. The difference is the amount of data remaining to be read out.

The output of the subtractor unit 51 is converted to the analog control signal by an analog to digital (A/D) converter 52 and applied to the sampling circuit 42 and clock generator 46. The frequency of the clock pulse generator 46 and thereby the horizontal scan rate are determined by the magnitude of the control signal.

The control signal is also applied to an input of a differential amplifier 53. A speed sensor 54 such as a tachometer or photoelectronic device is provided to the motor shaft 19 to sense the motor shaft speed and correspondingly the vertical scan rate. The sensor 54 produces a signal which is fed through an amplifier 56 and a frequency to voltage (F/V) converter 57 to another input of the differential amplifier 53. The output of the differential amplifier 53 is applied to the motor drive unit 38 to control the speed of the motor 39. The output of the F/V converter 57 corresponds to the vertical scan rate, and is compared with the output of the D/A converter which corresponds to the correct vertical scan speed for the prevailing data compression rate. The output of the differential amplifier 53 is an error signal which corrects the speed of the motor 39 to the proper value.

Figure 4:
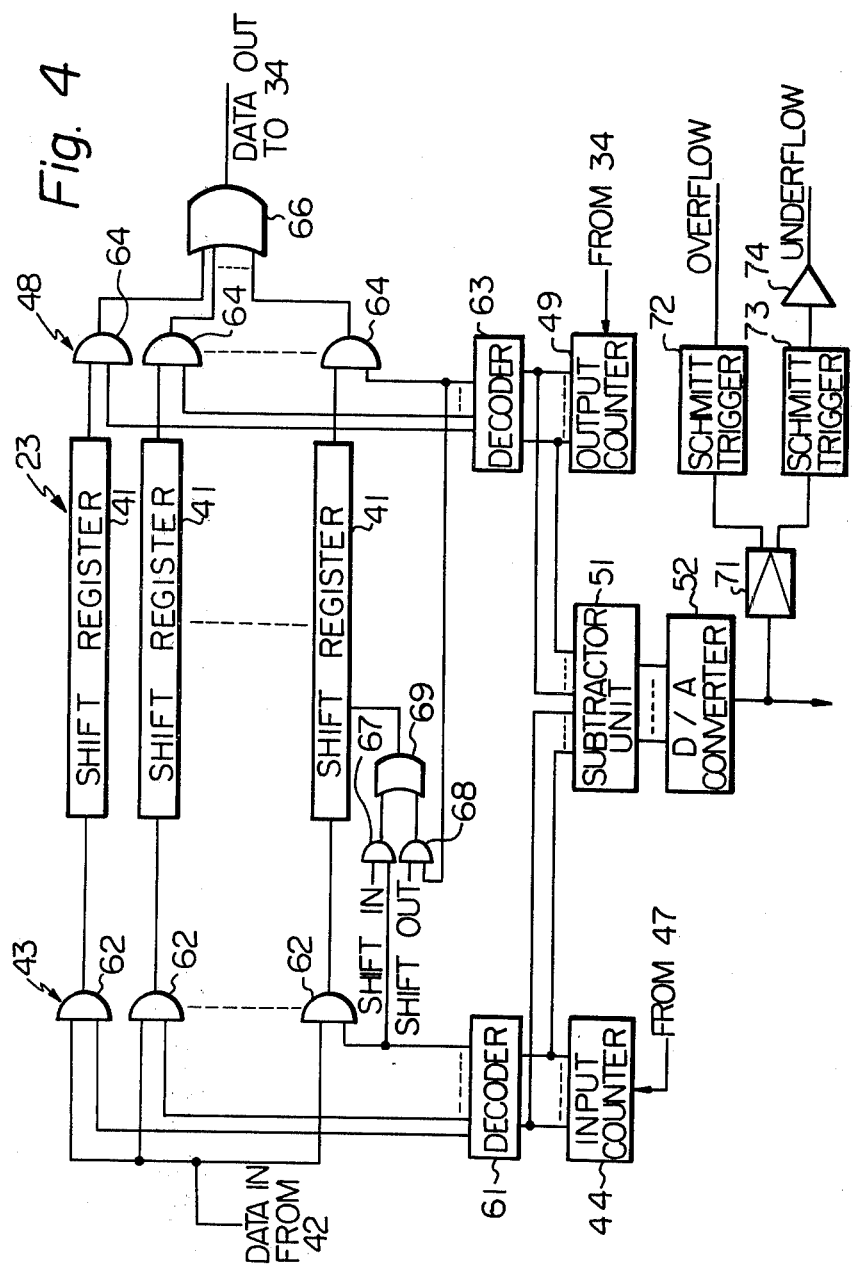
FIG. 4 is an even more detailed block diagram of a portion of the reading apparatus.

FIG. 4 illustrates the construction of the buffer memory 33 in greater detail. The input switch unit 43 comprises a decoder 61 responsive to the output of the input counter 44. The data signals from the sampling unit 42 are applied to inputs of AND gates 62 which are provided at the data inputs of the shift registers 41 respectively. Outputs of the decoder 61 are applied to other inputs of the AND gates 62. The decoder 61 applies a logically high signal to the input of one of the AND gates 62 to enable the same in response to the respective count in the input counter 44.

In an essentially similar manner the output switch unit 48 comprises a decoder 63 which is connected to the output of the output counter 49. The outputs of the shift registers 41 are connected to inputs of AND gates 64 respectively, the outputs of which are connected to inputs of an OR gate 66. The output of the OR gate 66 is connected to the data compression unit 34. The respective outputs of the decoder 63 are connected to other inputs of the AND gates 64 to sequentially enable the same in correspondence with the count in the counter 63.

Each shift register 41 is provided with AND gates 67 and 68 and an OR gate 69 although only one each is shown. The outputs of the decoders 61 and 63 are connected to the inputs of the AND gates 67 and 68 respectively, the outputs of which are connected to inputs of an OR gate 69. The output of the OR gate 69 is connected to the shift input of the respective shift register 41. Shift in and shift out pulses are applied to other inputs of the AND gates 67 and 68 from the clock generator 46 and data compression unit 34 respectively.

When a shift register 41 is enabled for input or output by a decoder 61 and AND gate 62 or decoder 63 and AND gate 64 respectively, the shift input is enabled simultaneously by the AND gates 67 and 68 to receive the input and output shift pulses respectively.

The control signal from the D/A converter 52 is applied through an amplifier 71 to Schmitt triggers 72 and 73 respectively. The trip point of the Schmitt triggers 72 is set to a value of the control signal indicating that the amount of unread data in the memory 33 is equal to or exceeds the capacity. The Schmitt trigger 73 is set for a trip point indicating that all or excess data has been read out of the memory 33. The output of the Schmitt trigger 73 is fed through an inverter 74. High outputs of the Schmitt trigger 72 and inverter 74 indicate overflow and underflow respectively of the buffer memory 33 and shut down the apparatus 11 or activate a warning alarm when produced.

Figure 5:
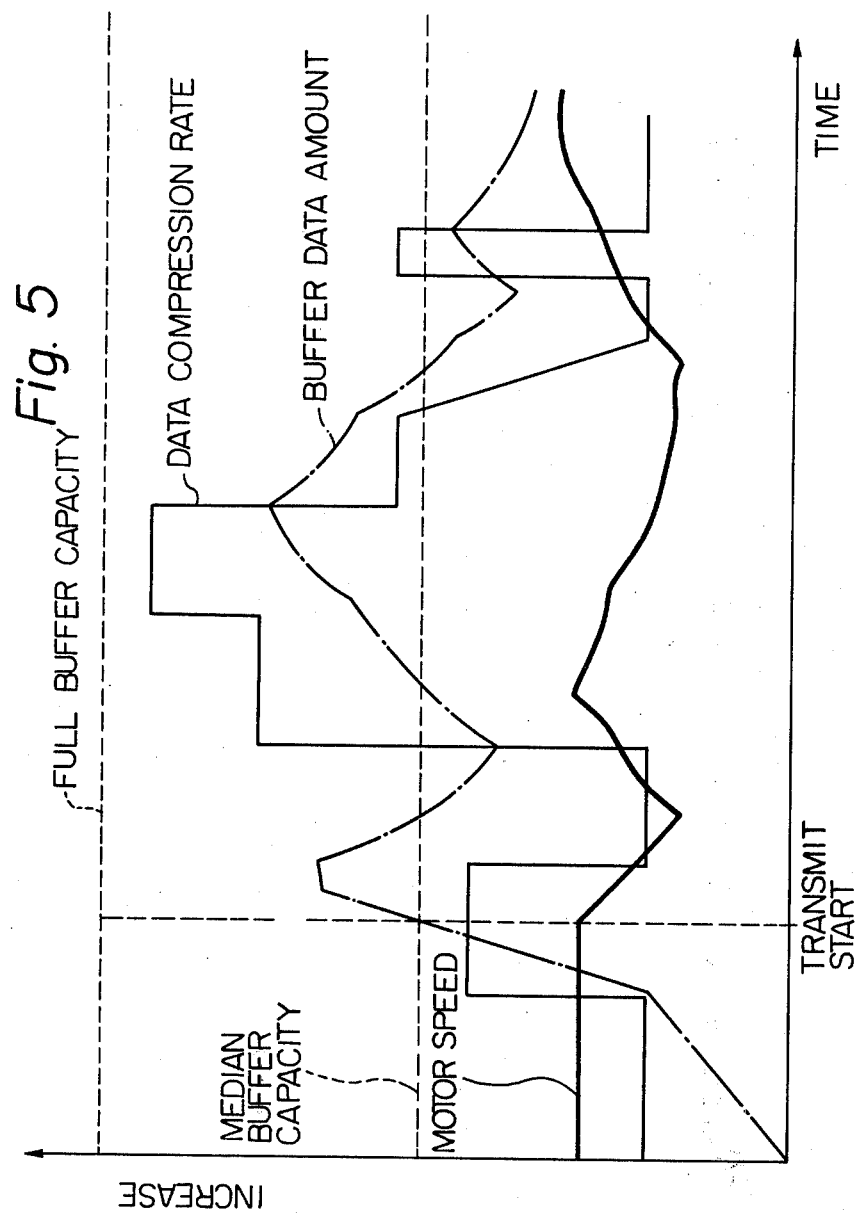
FIG. 5 is a graph illustrating the operation of the reading apparatus.

FIG. 5 is a graph illustrating the operation of the apparatus 11. It will be noted that the motor speed and thereby the vertical scan rate are increased in accordance with the data compression rate and that the amount of unread data in the buffer memory 33 fluctuates around the median buffer capacity.

In summary, it will be seen that the present optoelectronic reading apparatus increases the performance of optical reading and lowers the complexity, size and manufacturing cost of the apparatus. In particular, improved performance is obtained with a small buffer memory and scan drive motor. Various modifications will become possible for those skilled in the art after receiving the teachings of the present disclosure without departing from the scope thereof.

What is claimed is:

1. An optoelectronic reading apparatus comprising: photosensor means;
  optical means for focussing a light image of a portion of an original document onto the photosensor means;
  scan drive means for producing relative scanning movement between the document, optical means for photosensor means;
  buffer memory means for storing electrical data signals produced by the photosensor means corresponding to the light image;
  data compression means for reading the data signals from the buffer memory means and performing data compression thereon in a predetermined manner;
  control means for sensing an amount of data signals in the buffer memory and controlling a scanning speed of the scan drive means in accordance therewith, the control means comprising input rate sensing means for sensing an input rate at which data signals are being stored in the buffer memory means, output rate sensing means for sensing an output rate at which the data signals are being read from the buffer memory means by the data compression means and first comparator means for comparing the input and output rates and producing an electrical analog control signal corresponding to a difference therebetween; and
  sensing means for sensing the scanning speed of the scan drive means and producing an electrical analaog speed signal corresponding thereto and second comparator means for comparing the control signal and the speed signal and adjusting a scanning speed in accordance with a difference therebetween.

2. An apparatus as in claim 1, in which the data compression means reads the data signals from the buffer memory means asynchronously with storing of the data signals in the buffer memory means by the photosensor means, a data compression speed of the data compression means decreasing and an amount of data in the buffer memory means thereby increasing as a proportion of high density areas of the light image increases.

3. An apparatus as in claim 1, further comprising a quantizer connected between the photosensor means and the buffer memory means for producing a first or second electrical data signal when a corresponding sensed portion of the light image is above or below a predetermined density respectively.

4. An apparatus as in claim 1, in which the scan drive means comprises an inertia motor.

5. An apparatus as in claim 1, in which the first comparator means comprises a subtractor.

6. An apparatus as in claim 1, in which the second comparator means comprises a differential amplifier.

7. An apparatus as in claim 1, in which the buffer memory means comprises a plurality of shift registers and means for sequentially enabling the shift registers.

8. An apparatus as in claim 1, in which the photosensor means comprises a linear photosensor array and means for scanning the array.

9. An apparatus as in claim 1, in which the control means decreases the scanning speed as the amount of data signals in the buffer memory means increases.

10. An apparatus as in claim 1 in which the control means and sensing means are constructed to increase the scanning speed when the output rate is greater than the input rate and vice-versa.

11. An apparatus as in claim 10 in which the sensing means is constructed to increase the scanning speed when a magnitude of the control signal is greater than a magnitude of the speed signal and vice-versa.

* * * * *